Figure 2:
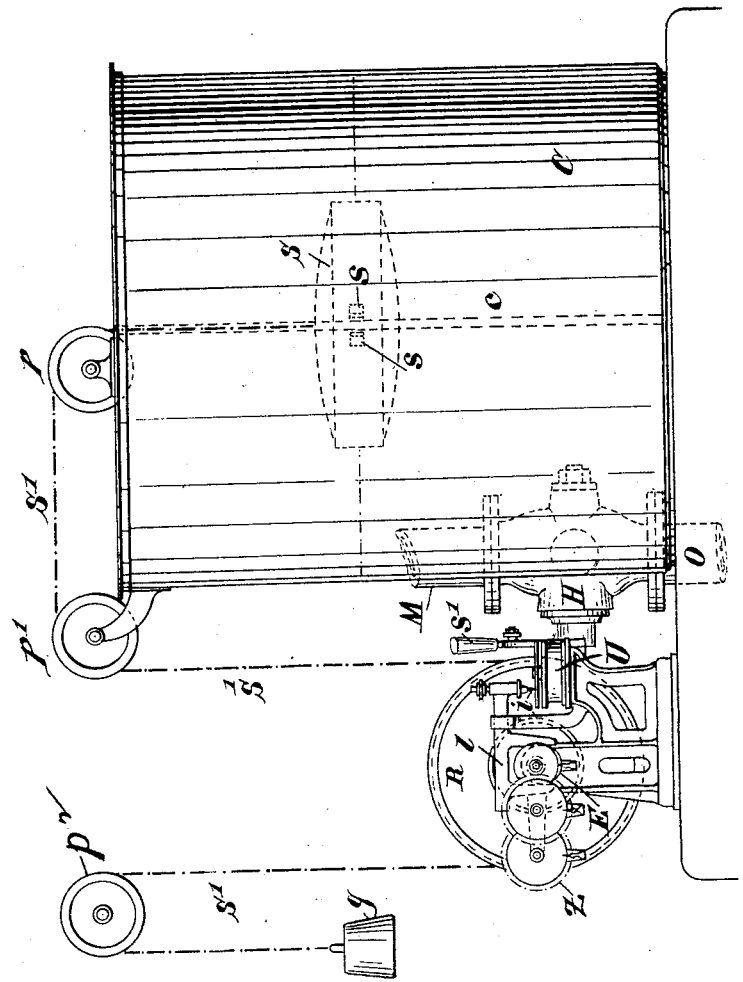

(No Model.) 2 Sheets—Sheet 1.
E. SPIRO.
FLUID METER.
No. 476,934. Patented June 14, 1892.
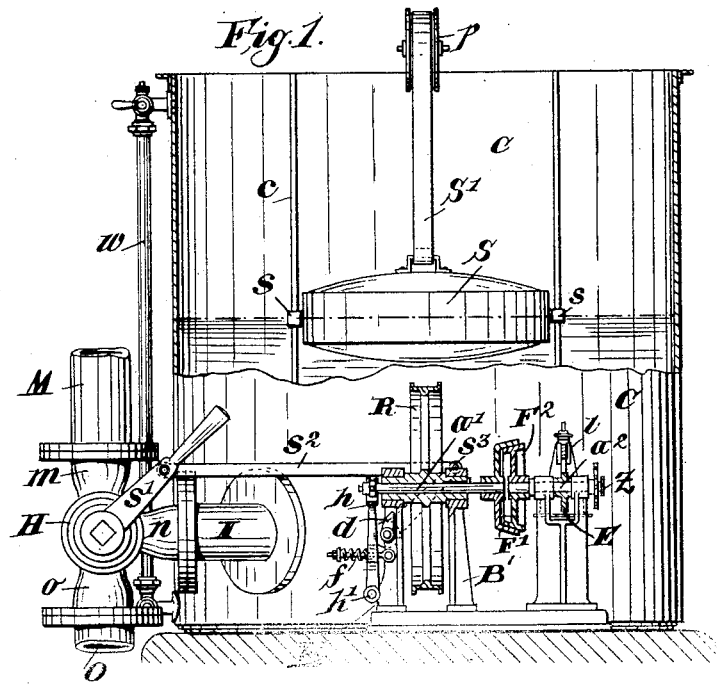
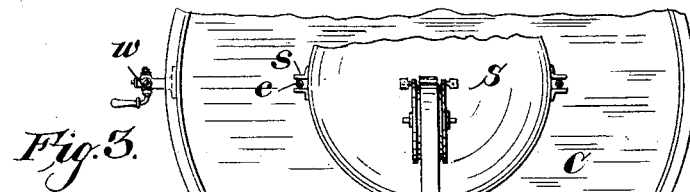
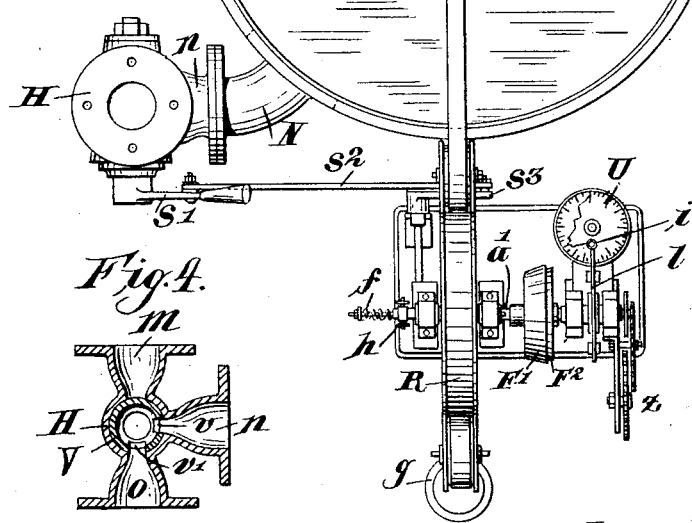
Witnesses:
H. G. Dieterich
O. W. Sommers
Inventor:
Emanuel Spiro,
By [signature] Atty.

(No Model.) 2 Sheets—Sheet 2.

E. SPIRO.
FLUID METER.

No. 476,934. Patented June 14, 1892.

Witnesses:
H. G. Dieterich
B. W. Sommers

Inventor:
Emanuel Spiro,
By [signature]
Atty.

UNITED STATES PATENT OFFICE.

EMANUEL SPIRO, OF KRUMAU, AUSTRIA-HUNGARY.

FLUID-METER.

SPECIFICATION forming part of Letters Patent No. 476,934, dated June 14, 1892.

Application filed February 27, 1892. Serial No. 423,009. (No model.) Patented in Belguim October 1, 1891, No. 96,626, and in Italy December 31, 1891, XXV, 30,622, LX, 108.

*To all whom it may concern:*

Be it known that I, EMANUEL SPIRO, a subject of the Emperor of Austria-Hungary, residing at Krumau, in the Province of Bohemia, in the Empire of Austria-Hungary, have invented certain new and useful Improvements in Fluid-Meters, (for which Letters Patent have been obtained in Belgium, dated October 1, 1891, No. 96,626, and in Italy, dated December 31, 1891, Vol. XXV, No. 30,622/Reg. Att., Vol. LX, No. 108;) and I do hereby declare the following to be a full, clear, and exact description of the invention, such as will enable others skilled in the art to which it appertains to make and use the same, reference being had to the accompanying drawings, and to letters of reference marked thereon, which form a part of this specification.

The invention relates to fluid-meters, and has for its object certain improvements whereby the amount or volume of fluid passing into or out of the vessel or whereby both the in and out flow of the fluid may be accurately measured and graphically or otherwise recorded.

To these ends the invention consists in the combination, with a float having a rising-and-falling motion with the liquid to be measured, of a recording device or mechanism and intermediate transmitting devices controlled by the float and controlling the recording device or mechanism.

The invention further consists in means whereby the movements of the float in one direction are or may be neutralized or annulled, so that the recording device or mechanism will remain inoperative during such movement of the float.

The invention further consists in the combination, with the admission and exhaust valve or cock, of mechanism for controlling the transmission of the movements of the float to the recording device or mechanism and in structural features and combinations of cooperative elements, as will now be fully described, reference being had to the accompanying drawings, in which—

Figure 1 is a vertical sectional elevation of a fluid-meter embodying my invention. Fig. 2 is an elevation taken at right angles to Fig. 1. Fig. 3 is a top plan view of Fig. 1, a portion of the fluid-reservoir being broken away; and Fig. 4 is a vertical transverse section of the three-way valve or cock.

Similar letters indicate like parts wherever such may occur in the figures of drawings above described, in which—

C indicates the fluid-reservoir, which must be of uniform cross-sectional area throughout in order that accurate measurements of the liquid flowing into or out of the same may be obtained, as will be readily understood. The reservoir or vessel C is provided with a level glass $w$, and within the said vessel or reservoir C are arranged two guide-rods $c$, that guide a float S in its rising and falling movements with the liquid, said float being provided on opposite sides with forked brackets $s$, that straddle the said guide-rods. The reservoir C is further provided with a supply and exhaust branch N, to which is secured the branch $n$ of a three-way valve casing or coupling H, the branch $m$ of which is secured to the supply-pipe M, and $o$ is the exhaust branch of said valve casing or coupling. As shown in Fig. 4, the valve-plug V has two ports $v$ and $v'$, whereby communication may be established between branches $n$ and N and the supply branch $m$ and pipe M or between said branches $n$ and N and the exhaust branch $o$ of the casing or coupling H by properly positioning the valve V through the medium of the hand-lever $s'$.

For the purposes of this description and as shown in the drawings the arrangement of the three-way coupling H and its valve V and of the recording and transmitting mechanism is such that the outflow of liquid only is measured. To this end the float S has attached thereto a belt or strap that passes over two guide-pulleys $p$ and $p'$, thence around a pulley R, and finally over a pulley $p^2$, the free end of the belt S' having secured thereto a counterbalancing-weight $g$, which not only serves to counterbalance the float S, but also to prevent the slackening of the belt S'. By the means described the rectilinear motion of the float S in either direction is converted into rotary motion through the pulley R, which is caused to revolve in one direction during the inflow of liquid into vessel C and in a reverse direction during the outflow of such liquid, said rotary motion of the pulley R being transmitted to its shaft $a'$, to which the pulley is secured.

The recording mechanism may consist of a well-known train of recording-gearing Z, Fig. 2, to the driving-shaft $a^2$ of which the motion of the float in one direction is transmitted through the pulley R and its shaft $a'$, as hereinafter described, or means may be provided for graphically recording the movements of the float, or both these devices may be employed, as a shown in Fig. 2.

In order that the rotation of the pulley R in one direction may be transmitted to the recording device or devices, and its rotation in a reverse direction neutralized or annulled so as to have no effect upon said device or devices, I make use of the following instrumentalities: Upon the shaft $a'$, that carries the pulley R, is secured a hollow friction-cone F', that co-operates with a like cone $F^2$ on a shaft $a^2$. The shaft $a'$ has endwise motion in its bearings in the standard B, and is connected at its left-hand end with a lever $h$, fulcrumed to standard B at $h'$. The lever $h$ is continuously acted upon by a spring $f$, exerting its power on the lever $h$, so as to maintain the shaft $a'$ in a normal position, in which the elements F' $F^2$ of the friction-clutch are held in engagement, so that the rotation of the pulley R will be transmitted to the shaft $a^2$, and through the latter to the recording-gearing Z or to a graphic recorder consisting of a graduated dial U, Fig. 3, having a continuous uniform rotation about its axis imparted thereto by a suitable clock mechanism, and a pencil or tracer $i$, having a reciprocating motion imparted thereto by an eccentric E, secured to shaft $a^2$ and revolving between pendent arms of a pencil-carrier $l$, which pencil $i$ is thus caused to trace a zigzag record-line upon the said dial within two circles concentric with the axis of its rotation. If the dial is graduated to units of time, the distance between two successive inner or outer points of the zigzag line will correspond to the period of time required for a given volume of liquid to flow out of the vessel C, and consequently to a complete revolution of the pulley R and a complete reciprocation of the eccentric E. Now if the dimensions of the vessel C—that is to say, its cross-sectional area—is such that a movement of the float sufficient to impart to the pulley R a complete movement will correspond to a given number of units of measure, the volume of liquid flowing out of the receiver during a given time will be accurately recorded by the pencil upon the dial U. Instead of the eccentric E a crank on shaft $a^2$ may be employed for imparting a reciprocating motion to the pencil-carrier $l$, as will be readily understood.

In order that the valve V may control the friction-clutch, the hand-lever $s'$ is connected through the medium of a rod $s^2$ with a lever $s^3$, on the fulcrum or pivot of which is secured a radial arm or cam $d$, adapted to engage the spring-actuated lever $h$ when the valve V is brought to a given position, thereby moving shaft $a'$ from right to left and uncoupling said shaft from shaft $a^2$ by moving the clutch element F' out of engagement with the clutch element $F^2$.

As has been stated above, the recording devices and the transmitting mechanism are so arranged that the outflow of liquid alone is measured. Supposing, therefore, the vessel C to be empty and the transmitting mechanism in the position shown in Fig. 1, both shafts $a'$ $a^2$ being coupled together by the friction-clutch F' $F^2$, if the valve-lever $s'$ is turned to the left, so that the ports $v$ and $v'$ will communicate with the branches $m$ and $n$, respectively, of the three-way coupling H, the liquid in pipe M will flow into vessel C, the exhaust branch $o$ of the coupling being closed, the float will rise with the liquid entering the said vessel and revolve the pulley R, its shaft $a^2$, and clutch element F', but not the clutch element $F^2$, for the reason that the movement of the valve-lever from right to left has caused the radial arm or cam $d$ on the pivot of lever $s^3$ to impinge upon lever $h$, thereby moving shaft $a^2$ in the same direction as that of the valve-lever $s'$ and uncoupling the shafts $a'$ $a^2$, so that the revolutions of the pulley R will not be transmitted to the eccentric E and pencil-carrier or to the recording-gearing Z. If it is now desired to draw liquid from the vessel C and measure the quantity of liquid drawn off, the valve-lever $s'$ is moved from left to right, as shown in Fig. 1, whereby the radial arm $d$ will be disengaged from lever $h$, the spring $f$ moving the shaft $a'$ from left to right, bringing the coupling elements F' $F^2$ into engagement, so that the downward movement of the float S will be transmitted to the eccentric E, and through the latter to the pencil-carrier $l$ or to the recording-gearing Z, or to both. This movement of the valve-lever $s'$ places the valve V in such position that the inlet $m$ will be closed and communication established between branches $n$ N and the outlet branch $o$, as shown in Fig. 4, thus allowing the liquid to flow out of vessel C.

The great advantage resulting from the use of the transmitting mechanism described is the accuracy with which the movements of the float S are transmitted to the recording device or devices, which is due to the instantaneous coupling and uncoupling of the shafts $a'$ $a^2$ through the medium of the friction-clutch F' $F^2$, which, as shown, is composed of two elements having extended frictional surfaces.

It is obvious that other clutch mechanisms or coupling devices may be used, or transmitting gearing; but in view of the fact that such devices cannot be thrown into or out of gear instantaneously the measurements will not be accurate, for the reason that the liquid will flow out of vessel C unmeasured during the time the coupling of the shafts is effected.

The power necessary to effect an instantaneous coupling is derived from the spring $f$, which exerts its power the moment the lever $h$ is released from the action of the radial arm $d$, and this displacement of the shaft $a'$ by the spring $f$ will take place even should the valve-lever $s'$ not have been moved to the limit of its throw and the valve V completely turned, so that any liquid flowing out of branch $o$ will be measured whether said valve is completely open or not. Instead of the spring $f$ a weight or weights may be employed to maintain the shaft $a'$ in a normal position.

It will be readily understood that instead of measuring the outflow of liquid the inflow may be measured simply by reversing the position of the transmitting and recording devices from the right to the left of shaft $a'$. On the other hand, both the inflowing and outflowing liquid may be measured by the use of two shafts $a^2$, one at each end of shaft $a'$, and the necessary friction-clutches and recording devices, in which case one or the other of the shafts $a^2$ will be clutched or coupled to shaft $a'$ at each movement of the lever $s'$. Finally, separate inlet and outlet cocks may be used and operated by the same hand-lever $s'$, said cocks being so constructed that one of them will be in communication with the vessel C, when the lever $s'$ is in a given position—that is to say, the outlet-cock will be closed when the inlet-cock is open, and vice versa.

I have deemed it unnecessary to illustrate these various modifications, as they come clearly within the province of the skilled mechanic conversant with the characteristic features of my invention, and I would have it understood that the said modifications come clearly within the scope of this invention without departing from the nature or spirit thereof.

Having thus described my invention, what I claim as new therein, and desire to secure by Letters Patent, is—

1. In a fluid-meter, a fluid-reservoir, a valve for controlling the flow of liquid to and from the reservoir, a lever for operating said valve, a float having a rising and falling motion with the liquid flowing into or out of said reservoir, a recording mechanism, a transmitting mechanism for transmitting the movements of the float to the recording mechanism, and a shifting device controlled by the valve-lever for throwing the transmitting and recording mechanisms into or out of gear, for the purposes set forth.

2. In a fluid-meter, a fluid-reservoir, a float having a rising and falling motion with the liquid entering into or flowing out of said reservoir, a recording mechanism, its driving-shaft, and means for transmitting the movements of the float to the driving-shaft of the recording mechanism, comprising a revoluble and endwise-movable shaft, a pulley thereon, and a belt connecting the pulley with the float, and a clutch-coupling, one element of which is secured to the driving-shaft of the recording mechanism and the other to the endwise-movable pulley-shaft, for the purpose set forth.

3. In a fluid-meter, a fluid-reservoir, an inlet and outlet valve therefor, a lever for operating the same, a float having a rising and falling motion with the liquid flowing into or out of said vessel, a recording mechanism, its driving-shaft, means for transmitting the movements of the float to said shaft, comprising a revoluble and endwise-movable shaft, a pulley thereon, a belt connecting the pulley with the said shaft, and a clutch-coupling, one of the elements of which is secured to the driving-shaft of the recording mechanism and the other to the endwise-movable pulley-shaft, in combination with a shifting-lever for shifting the endwise-movable pulley-shaft, and a connection between said lever and the valve-lever, for the purpose set forth.

4. In a fluid-meter, a fluid-reservoir, a float having a rising and falling motion with the liquid in the reservoir, and a recording mechanism comprising a revoluble shaft, an eccentric thereon, a pencil-carrier adapted to be reciprocated by the eccentric, and a graduated dial having a uniform rotation about its axis arranged for co-operation with the pencil-carrier, in combination with a transmitting mechanism for transmitting the movements of the float to the eccentric-shaft, for the purpose set forth.

5. In a fluid-meter, a fluid-reservoir, a valve for controlling the flow of liquid to and from the reservoir, a valve-lever, a float having a rising and falling motion with the liquid in the reservoir, and a recording mechanism comprising a graduated dial having a uniform rotation about its axis, a pencil-carrier adapted to co-operate with the dial, a revoluble shaft and an eccentric thereon adapted to impart a reciprocating movement to the pencil-carrier, in combination with a transmitting mechanism for transmitting the movements of the float to the eccentric-shaft, a clutch-coupling interposed between the eccentric-shaft and the transmitting-shaft, said clutch-coupling being controlled by the valve-lever, for the purpose set forth.

6. The combination, with the float S, the dial U, pencil-carrier $l$, shaft $a^2$, and eccentric E and friction-cone $F^2$ thereon, of the endwise-movable shaft $a'$, carrying the friction-cone F′, the pulley R, and belt S′, substantially as and for the purpose set forth.

7. The combination, with the vessel C, the two-way valve V and its lever $s'$, the float S, the dial U, pencil-carrier $l$, and shaft $a^2$, carrying the eccentric E and friction-cone $F^2$, of the endwise-movable shaft $a'$, carrying the friction-cone $F'$ and the pulley R, the belt $S'$, the spring-actuated lever $h$, connected with shaft $a'$, the lever $s^3$, connected with the valve-lever $s'$, and the cam $d$ on the pivot of said lever $s^3$, substantially as and for the purpose set forth.

In testimony whereof I affix my signature in presence of two witnesses.

EMANUEL SPIRO.

Witnesses:
W. B. MURPHY,
A. SCHLESSING.